United States Patent
Fischer et al.

(10) Patent No.: US 10,491,851 B2
(45) Date of Patent: Nov. 26, 2019

(54) MEDIA STICK FOR CONTROLLING WIRELESS SPEAKERS

(71) Applicants: DOLBY LABORATORIES LICENSING CORPORATION, San Francisco, CA (US); DOLBY INTERNATIONAL AB, Amsterdam Zuidoost (NL)

(72) Inventors: David Matthew Fischer, San Francisco, CA (US); Timothy James Eggerding, Oakland, CA (US); Christian Wolff, San Leandro, CA (US); Bartosz Budzanowski, Wroclaw (PL); Tomasz Bartczak, Wroclaw (PL)

(73) Assignees: Dolby Laboratories Licensing Corporation, San Francisco, CA (US); Dolby International AB, Amsterdam Zuidoost (NL)

( * ) Notice: Subject to any disclaimer, the term of this patent is extended or adjusted under 35 U.S.C. 154(b) by 0 days.

(21) Appl. No.: 15/557,450

(22) PCT Filed: Mar. 3, 2016

(86) PCT No.: PCT/US2016/020761
§ 371 (c)(1),
(2) Date: Sep. 11, 2017

(87) PCT Pub. No.: WO2016/148935
PCT Pub. Date: Sep. 22, 2016

(65) Prior Publication Data
US 2018/0115733 A1    Apr. 26, 2018

Related U.S. Application Data

(60) Provisional application No. 62/133,004, filed on Mar. 13, 2015.

(51) Int. Cl.
*H04N 5/60* (2006.01)
*H04N 5/44* (2011.01)
(Continued)

(52) U.S. Cl.
CPC ............. *H04N 5/4403* (2013.01); *H04N 5/60* (2013.01); *H04N 7/16* (2013.01);
(Continued)

(58) Field of Classification Search
CPC ........ H04N 7/16; H04N 7/173; H04N 5/4403; H04N 5/60; H04N 21/42204; H04N 21/43635; H04R 3/12; H04R 2420/07
(Continued)

(56) References Cited

U.S. PATENT DOCUMENTS 7,252,383 B2 *  8/2007  Ho ......................... G03B 21/14
                                                    348/838
7,987,294 B2 *  7/2011  Bryce ................. H04L 12/2809
                                                    709/208
(Continued)

FOREIGN PATENT DOCUMENTS

EP          1990992        11/2008

OTHER PUBLICATIONS

ViewHD Premium HDMI to HDMI+Audio (SPDIF+RAC L/R) Audio Extractor (Product page) ViewHD Premium HDMI to HDMI + Audio (SPDIF + RAC L/R) Audio Extractor http://www.amazon.com/ViewHD-Premium-Extractor-Converter-VHD-H2HSAs/dp/B00KBHX072/ref=sr_1_2?s=electronics&ie=UTF8&qid=1421797478&sr=1-2.
(Continued)

*Primary Examiner* — Trang U Tran

(57) ABSTRACT

A system and method of interfacing between a source media device, a destination media device and wireless speakers. A media stick provides the output video signal to the destina-
(Continued)

tion media device via a wired signal path, and provides the output audio signal to the wireless speakers via a wireless signal path. In this manner, a user may use a single device—the media stick—as both a connector between the devices and to provide the audio signal to the wireless speakers.

23 Claims, 8 Drawing Sheets

(51) Int. Cl.
*H04N 7/16* (2011.01)
*H04N 21/4363* (2011.01)
*H04S 3/00* (2006.01)
*H04N 21/422* (2011.01)
*H04R 3/12* (2006.01)

(52) U.S. Cl.
CPC . *H04N 21/42204* (2013.01); *H04N 21/43635* (2013.01); *H04R 3/12* (2013.01); *H04S 3/008* (2013.01); *H04R 2420/07* (2013.01)

(58) Field of Classification Search
USPC ........ 725/153, 100, 131, 151; 348/552, 725, 348/738; 381/59, 58, 79, 7
See application file for complete search history.

(56) References Cited

U.S. PATENT DOCUMENTS

| | | |
|---|---|---|
| 8,320,824 B2 | 11/2012 | Banks |
| 8,505,054 B1 | 8/2013 | Kirley |
| 9,516,291 B2 * | 12/2016 | Toye ........................ H04N 5/63 |
| 2004/0071294 A1 * | 4/2004 | Halgas, Jr. ............ H04B 5/0006 381/59 |
| 2006/0236354 A1 * | 10/2006 | Sutardja ................. H04H 20/08 725/100 |
| 2009/0079883 A1 | 3/2009 | Banks |
| 2009/0081948 A1 | 3/2009 | Banks |
| 2010/0040082 A1 * | 2/2010 | Raveendran ........ H04L 12/2818 370/464 |
| 2012/0188456 A1 | 7/2012 | Kuroyanagi |
| 2012/0243158 A1 | 9/2012 | Gentil |
| 2014/0180459 A1 | 6/2014 | Lo |
| 2015/0350592 A1 * | 12/2015 | Qiu .......................... H04N 7/01 348/441 |

OTHER PUBLICATIONS

HDMI 2CH/5.1CH Audio Extractor (instruction manual). http://www.a-neuvideo.com/pdf/UG-ANI-51CH.pdf.

* cited by examiner

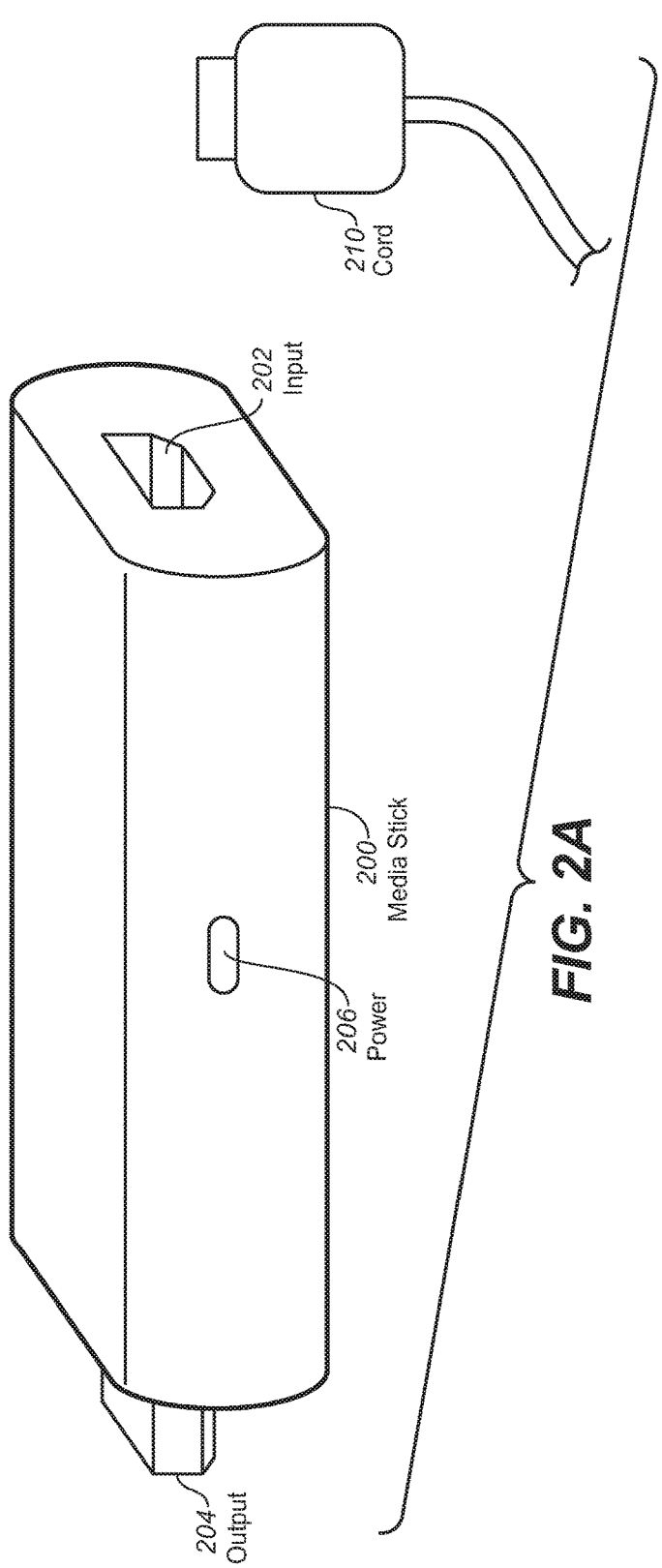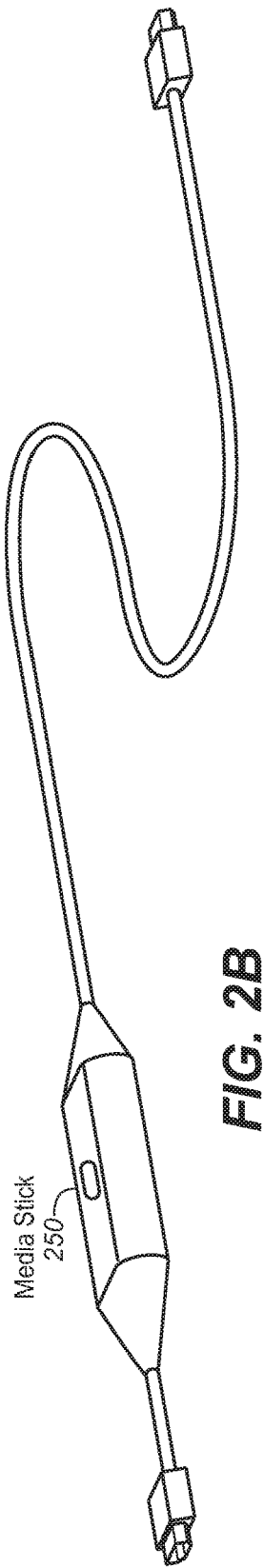
FIG. 2A
FIG. 2B

MEDIA STICK FOR CONTROLLING WIRELESS SPEAKERS

CROSS REFERENCE TO RELATED APPLICATIONS

This application claims priority to U.S. Provisional Patent Application No. 62/133,004, filed on Mar. 13, 2015, which is hereby incorporated by reference in its entirety.

BACKGROUND

The present invention relates to home theater equipment, and in particular, to devices for connecting between source devices, display devices, and wireless speakers.

Unless otherwise indicated herein, the approaches described in this section are not prior art to the claims in this application and are not admitted to be prior art by inclusion in this section.

A common component in home entertainment environments (home theater, home television, etc.) is an audio/video receiver (AVR). The AVR generally performs three functions. First, the AVR provides a connection point for multiple source devices, and the AVR is responsible for switching among the inputs. Second, the AVR performs amplification for wired speakers. Third, the AVR performs audio decoding and processing (e.g., surround sound processing, Dolby Pro Logic™ processing, Dolby Digital™ processing, Dolby TrueHD™ processing, etc.).

A recent development in home entertainment environments is media sticks. In general, a media stick provides a wired connection to a display device that displays the content (e.g., a television), and another connection (often wireless) to a source device that provides the content. A media stick generally has the form factor of a "dongle", sized such that it can be easily grasped in-hand, and has one or more input, output and power supply interfaces. The interfaces of the media stick may be connected to cords or other wired connectors, or may have short corded portions that extend the interfaces beyond the body of the media stick. Media sticks may also be referred to as streaming sticks. A media stick may be controlled by a separate device, such as a dedicated remote control or an application on a mobile telephone.

Examples of media sticks include the Chromecast™ media stick from Google, Inc., the Fire TV Stick™ from Amazon, Inc., and the Roku Streaming Stick™ from Roku, Inc. The Chromecast™ media stick, for example, has a High-Definition Multimedia Interface (HDMI™) output for connecting to the HDMI™ input of a television, a power input, and a wireless interface for interacting with a control application on a mobile phone and for receiving content. The Chromecast™ media stick may receive the content from a nearby device (e.g., a mobile telephone, a laptop computer, etc.) or may connect to a router and receive the content via the internet (e.g., from the YouTube™ website, from the HBO Go™ website, etc.).

Media sticks may be considered to fall within a subset of devices referred to as digital media players, digital media adapters, or micro-consoles. Other types of digital media players include devices in the form factor of set-top boxes (larger than dongles) that connect to a display device via a cable. Examples of these larger devices include the Apple TV™ from Apple, Inc., the Fire TV™ from Amazon, Inc., and the Roku Streaming Player™ from Roku, Inc.

Another type of device used in home entertainment environments may generally be referred to as a wireless connector. In general, wireless connectors function as "wireless cables" that may be used in place of a wired connection (cable) between media devices. For example, when a digital video disc (DVD) player is in one room and a television is in another room, a wireless connector may be used in place of a long HDMI™ cable. The wireless connector generally includes two components: a transmitter and a receiver. The transmitter is often larger (e.g., in the form factor of a set-top box), and connects to the source device that provides the content. The receiver is often smaller (e.g., in the form factor of a dongle), and connects to the display device that displays the content. Example wireless connector protocols include the Wireless Home Digital Interface (WHDI™) protocol, the WirelessHD™ protocol (also referred to as the WiHD™ protocol), the WiGig™ 802.11ad protocol, the Miracast™ protocol, the Wireless Display (WiDi™) protocol, and the AirPlay™ protocol. Notably, wireless connectors transmit the full media signal, which includes both video and audio signals.

Another type of device used in home entertainment environments is wireless speakers. In general, wireless speakers receive the input audio signal wirelessly, instead of receiving an electrical audio signal via a wire. The wireless speakers may be a single device (e.g., a sound bar) or multiple devices (e.g., center, left, right, left surround, and right surround speakers), and may output one or more audio channels (e.g., stereo, 5.1 surround, etc.). Wireless speakers often connect to the audio source via a Bluetooth™ connection, a WiFi™ connection, or proprietary connections (e.g., using other radio frequency transmissions), which may (or may not) be based on WiFi™ standards or other standards.

SUMMARY

Given the above, there is a need to replace the AVR. First, many televisions now have multiple inputs, so the connection and switching functions of the AVR are not required. Second, wireless speakers often include their own amplifiers, so the amplification functions of the AVR are not required. Third, audio decoding and processing may be performed by devices other than the AVR. Embodiments are directed to a media stick that provides a wired connection for the video signal (from the source device to the display device) and a wireless connection for the audio signal (to the wireless speakers). The media stick provides a replacement for the AVR.

According to an embodiment, an apparatus interfaces between a source media device and a destination media device via a wired signal path. The apparatus includes an input interface, a processor, an output interface, and an output audio transmitter. The input interface receives an input signal via a wired input signal path. The input signal includes an input audio signal and an input video signal. The processor receives the input signal from the input interface, generates an output video signal, and generates an output audio signal. The output video interface receives the output video signal from the processor and outputs the output video signal via a wired output signal path. The output audio transmitter receives the output audio signal from the processor and transmits the output audio signal via a wireless signal path.

The apparatus may be integrated with cables for connecting with the source and destination media devices.

The apparatus may have two male connectors, a sensing circuit, and a routing circuit, that enable the apparatus to operate in a bi-directional manner.

According to an embodiment, a method interfaces between a source media device and a destination media device via a wired signal path. The method includes receiving an input signal via a wired input signal path. The input signal includes an input audio signal and an input video signal. The method further includes generating an output video signal from the input signal, and generating an output audio signal from the input signal. The method further includes outputting the output video signal via a wired output signal path. The method further includes transmitting the output audio signal via a wireless signal path.

According to an embodiment, a system interfaces between a source media device and a destination media device via a wired signal path. The system includes a media stick and at least one wireless speaker. The media stick includes an input interface, a processor, an output interface, and an output audio transmitter. The input interface receives an input signal via a wired input signal path. The input signal includes an input audio signal and an input video signal. The processor receives the input signal from the input interface, generates an output video signal, and generates an output audio signal. The output video interface receives the output video signal from the processor and outputs the output video signal via a wired output signal path. The output audio transmitter receives the output audio signal from the processor and transmits the output audio signal via a wireless signal path. The at least one wireless speaker that receives the output audio signal via the wireless signal path and outputs an acoustic signal that corresponds to the output audio signal.

The system may further include a remote control that exchanges information with the media stick.

The system may further include a display device, coupled to the output video interface via the wired output signal path, that receives the output video signal and that displays a video output that corresponds to the output video signal.

The system may further include a source device, coupled to the input interface via the wired input signal path, that generates the input signal.

The system may further include a second media stick, a second display device and a second set of wireless speakers. The remote control controls sending signals from the source device to the first media stick, from the first media stick to the second media stick, and from the second media stick to the second display device to display the video, and to the second set of wireless speakers to output the audio.

The system may further include a second media stick coupled to the same display device as the first media stick, where the remote control controls which media stick sends video to the display device and to the wireless speakers.

The following detailed description and accompanying drawings provide a further understanding of the nature and advantages of embodiments of the present invention.

BRIEF DESCRIPTION OF THE DRAWINGS

FIG. 2A is a perspective view of a media stick 200.

FIG. 2B is a perspective view of a media stick 250 that is integrated with two HD cables.

DETAILED DESCRIPTION

Figure 1:
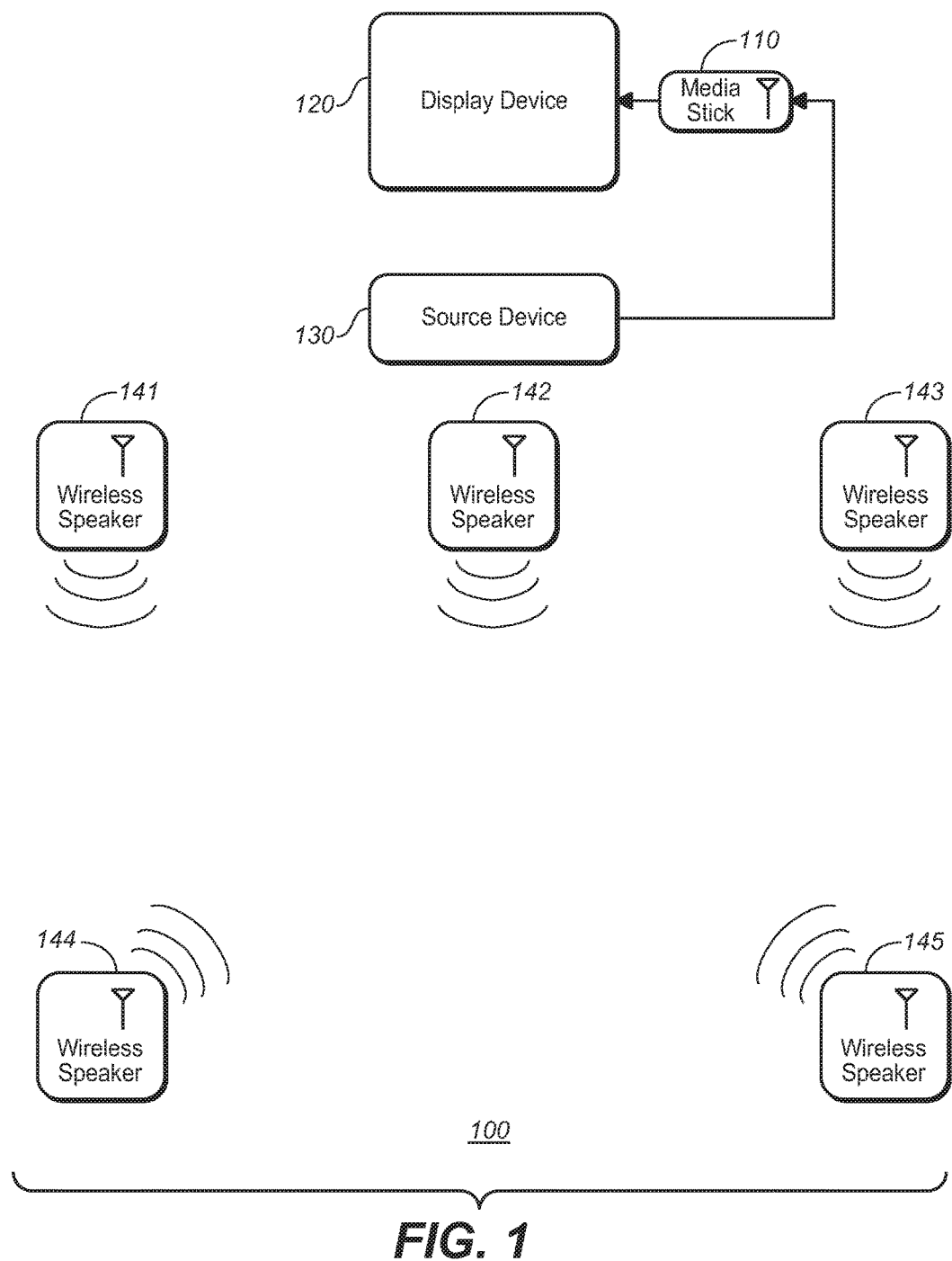
FIG. 1 is a block diagram of a system 100 in a home entertainment environment.

Described herein are techniques for audio and video signal processing. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having an inclusive meaning. For example, "A and B" may mean at least the following: "both A and B", "at least both A and B". As another example, "A or B" may mean at least the following: "at least A", "at least B", "both A and B", "at least both A and B". As another example, "A and/or B" may mean at least the following: "A and B", "A or B". When an exclusive-or is intended, such will be specifically noted (e.g., "either A or B", "at most one of A and B").

This document uses the terms "home entertainment environment", "home theater environment" and "home television environment". These terms are generally synonymous and are used descriptively to provide context for the media sticks and systems described herein. It is to be understood that the media sticks and systems described herein are not limited to home usage, and may be used in other locations.

This document uses the terms "wired path" (or wired signal path) and "wireless path" (or wireless signal path). These terms are generally used in order to provide a clarifying distinction to the description. For example, the term "wired path" is used to distinguish that path from a wireless path, and the term "wireless path" is used to distinguish that path from a wired path. For clarity, the descriptors "input" and "output" may be added to clarify whether a path is an input to, or an output from, a particular component. For example, the media stick 110 (see FIG. 1) has a wired input signal path, a wired output signal path, and a wireless output signal path.

This document uses the terms "interface" and "connector". In general, these terms are used interchangeably. When precision is desired, the term "interface" is used when describing aspects that are more generally functional, and the term "connector" is used when describing aspects that are more generally structural.

This document discusses high-definition (HD) signals. In general, a high-definition signal has a pixel rate of above approximately 25 MHz, and (as of 2015) has a bitrate of up to 18 Gbit/s. Often a high-definition signal uses transition-minimized differential signaling (TMDS). A high-definition signal may have multiple channels, including a display data channel (DDC), a transition-minimized differential signaling (TMDS) data channel, a consumer electronics control (CEC) channel, an audio return channel (ARC), and a high-definition Ethernet channel (HEC). An example high-definition signal protocol is the High-Definition Multimedia Interface (HDMI™) protocol.

FIG. 1 is a block diagram of a system 100 in a home entertainment environment. The system 100 includes a media stick 110, a display device 120, a source device 130, and wireless speakers 141, 142, 143, 144 and 145. The media stick 110 may connect directly to the display device 120, or may be connected with an output cord. The media stick 110 connects to the source device 130 with an input cord to the display device 120 than to the source device 130.

The media stick 110 generally receives an input signal from the source device 130 via a wired input path, generates an output video signal and an output audio signal, outputs the output video signal to the display device 120 via a wired output signal path, and transmits the output audio signal to the wireless speakers 141-145 via a wireless path. In general, the wired paths are HD signal paths, so the media stick 110 functions as an HD connector. More details of the media stick 110 are provided below.

The display device 120 generally displays the output video signal received from the media stick 110 via the wired output signal path. The display device 120 may also be referred to as a sink or sink device. The display device 120 may be a television, a high-definition television, a projector, a computer monitor, etc.

The source device 130 generally generates the input signal received by the media stick 110 via the wired input signal path. The source device 130 may be a digital video disc player, a Blu-ray Disc™ player, a gaming console, a set-top box, a television receiver, a display controller of a computer, a laptop computer, etc. The media stick 110 may also receive input signals from other sources, such as content from a wireless connection to the internet (e.g., a Netflix™ stream), content streamed by a mobile telephone or tablet, etc.

The wireless speakers 141-145 generally receive the output audio signal from the media stick 110 via the wireless path and output acoustic signals that correspond to the output audio signal. As indicated by their name, the wireless speakers 141-145 do not receive the output audio signal via a wired path. (However, the wireless speakers 141-145 may have a wired connection to a power source.) Thus, the wireless speakers 141-145 may often be placed more quickly, and in a wider variety of configurations, in the home entertainment environment as compared to non-wireless speakers.

The wireless speakers 141-145 may be configured to output surround audio signals. For example, for 5-channel surround sound, the speaker 141 may output the left channel, the speaker 142 may output the center channel, the speaker 143 may output the right channel, the speaker 144 may output the left-surround channel, and the speaker 145 may output the right-surround channel. More or fewer speakers than the five wireless speakers 141-145 may be implemented for use in the system 100. For example, for 5.1-channel surround sound, a low-frequency effects wireless speaker may be added to the wireless speakers 141-145. For 7.1-channel surround sound, a low-frequency effects wireless speaker and two other wireless speakers (e.g., left and right rear channels, or left and right height channels, etc.) may be added to the wireless speakers 141-145. For stereo sound, two wireless speakers (e.g., left and right) may be used instead of the five wireless speakers 141-145. A single wireless speaker (e.g., a sound bar) may be used instead of the five wireless speakers 141-145. A flexible speaker layout may be used instead of the five wireless speakers 141-145. A flexible layout does not prescribe the number and position of speakers, or the number and type of channels; instead, the system implements object audio (e.g., Dolby Atmos™). A flexible layout is interesting for wireless speakers since their positioning need not account for speaker wires.

The wireless speakers 141-145 may connect to the media stick 110 via one or more wireless connection protocols, including a Bluetooth™ connection or a WiFi™ connection. More details of the interaction between the media stick 110 and the wireless speakers are provided below.

FIG. 2A is a perspective view of a media stick 200 (see also the media stick 110 of FIG. 1). The media stick 200 has an input interface 202, an output interface 204, and a power interface 206. The input interface 202 is a female interface and may be connected to the male end of a cord 210. The other end (not shown) of the cord 210 may be connected to the source device (e.g., the source device 130 of FIG. 1). Alternatively the cord 210 and the input interface 202 may be integrated as a single structure (e.g., the cord 210 extends from the input end of the media stick 200 and terminates in the input interface 202, providing in effect an extended input interface 202). The input interface 202 is a high-definition interface, e.g., a HDMI™ interface. The input interface 202 may be a Type A female HDMI™ interface.

The output interface 204 is a male interface and may be directly connected to the display device (e.g., the display device 120 of FIG. 1). Alternatively, the output interface 204 may be connected to the display device via a cord. As another alternative, the output interface 204 may include a cord. In such a case, the cord extends from the output end of the media stick 200 and terminates in the output interface 204. The output interface 204 is a high-definition interface, e.g., a HDMI™ interface. The output interface 204 may be a Type A male HDMI™ interface.

The power interface 206 provides a power connection to the media stick 200. The power interface 206 may be connected via a cord to a power source such as the display device, the source device, or a power adapter. The power source may supply 5 volts. For example, the power interface 206 may be a mini serial bus interface (e.g., a mini universal serial bus (USB) interface) that connects to a serial bus interface (e.g., a USB interface) of the display device. The power interface 206 may be a micro serial bus interface (e.g., a female micro-B USB interface). The placement of the power interface 206 may be on the side of the media stick 200 in order to allow the source and destination HD connectors (or cables) to remain in-line.

Alternatively to the power interface 206, power may be provided via the input interface 202 or the output interface 204. For example, the specification for HDMI™ 2.1 provides a power connection, and the input interface 202 or the output interface 204 may implement HDMI™ 2.1. In such a design, the power interface 206 may be omitted.

The media stick 200 may implement HD connectivity for both the input interface 202 and the output interface 204, for example HDMI™ version 1.4b connectivity. The media stick may support content protection such as high-bandwidth digital content protection (HDCP), for example HDCP version 1.4, for protection of copyright protected content output from the output interface 204.

The media stick 200 has a compact form factor, with a length of approximately 8 cm, a height (thickness) of approximately 1.3 cm, and a width of approximately 2.5 cm.

These dimensions may exclude any protruding interfaces (e.g., the output interface 204).

Alternatively, the media stick 200 may include a second power interface (e.g., a second female micro-B USB receptacle) for supplying power to additional USB devices (e.g. additional media sticks). This additional interface may be used when multiple media sticks are connected to the same device (e.g. a television), yet there is only one USB power source. The second power interface supplies power by daisy chaining.

The cord for connecting the power source to the power interface 206 may be a micro-B USB to standard-A USB type cable, at the approximate length of 20 cm long. The micro-B USB end may be molded to seamlessly attach to the media stick 200 to appear integrated into the design when attached.

FIG. 2B is a perspective view of a media stick 250 that is integrated with two HD cables (e.g., two HDMI™ cables) as a single integrated cable. The first cable may be 10 cm long, and have one male HD connector and one female HD connector. The female HD connector may be molded, such that when connected to the output interface of the media stick, seamlessly connects to appear integrated. The second cable may be 1 m long, and have two male HD connectors. One male HD connector may be molded, such that when connected to the input interface of the media stick, seamlessly connects to appear integrated. The net result gives the appearance of a single integrated cable, such that when the two cables plus the media stick are connected, they appear to be a single integrated cable with a bulge towards one end.

Alternatively, the media stick may be permanently integrated inline into a single HD cable. This alternative may be similar in appearance to the media stick 250, without the connections being visible to the user.

Alternatively, one cable may be an extension of the output interface (cf. the output interface 204) and the other cable may be an extension of the input interface (cf. the input interface 202) of the media stick.

Figure 3:
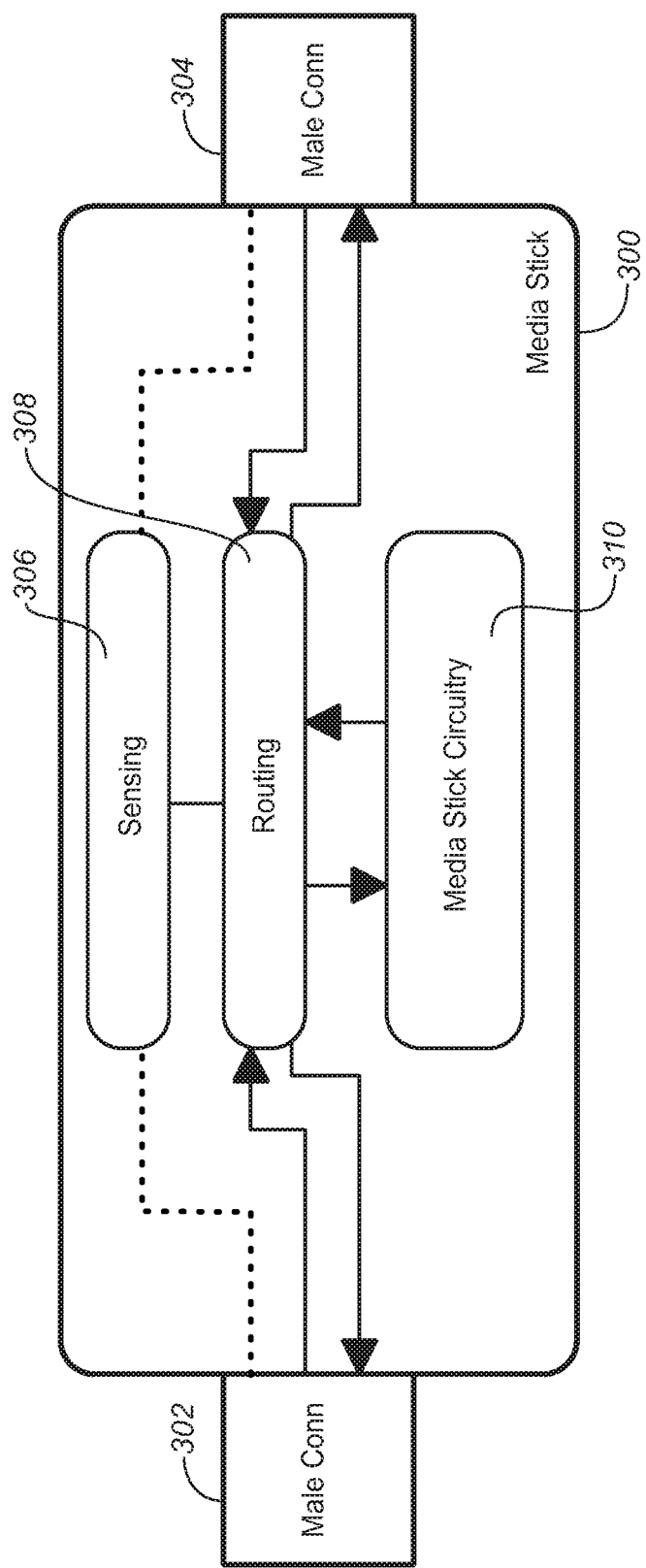
FIG. 3 is a block diagram of an alternate configuration for a media stick 300.

FIG. 3 is a block diagram of an alternate configuration for a media stick 300 (cf. the media stick 200 of FIG. 2A). The media stick 300 has two male connectors 302 and 304, a sensing circuit 306, a routing circuit 308, and media stick circuitry 310. The media stick circuitry 310 controls the operation of the media stick 300 as further detailed below.

When the connector 302 is connected to the display device (e.g., the display device 120 of FIG. 1), the sensing circuit 306 senses this connection and configures the media stick 300 to operate with the connector 302 as the output interface and the connector 304 to operate as the input interface. More specifically, the sensing circuit 306 instructs the routing circuit 308 to route inputs from the connector 304 (e.g., from the source device) to the media stick circuitry 310, and instructs the routing circuit 308 to route outputs from the media stick circuitry 310 to the connector 302 (e.g., to the display device).

When the connector 304 is connected to the display device (e.g., the display device 120 of FIG. 1), the sensing circuit 306 senses this connection and configures the media stick 300 to operate with the connector 304 as the output interface and the connector 302 to operate as the input interface. More specifically, the sensing circuit 306 instructs the routing circuit 308 to route inputs from the connector 302 (e.g., from the source device) to the media stick circuitry 310, and instructs the routing circuit 308 to route outputs from the media stick circuitry 310 to the connector 304 (e.g., to the display device).

The media stick 300 may also include (or be connected to) cords, as described above regarding the media stick 200 (see FIG. 2A).

The operation of the media stick (e.g., 110 or 200 or 300) is further detailed below.

Figure 4:
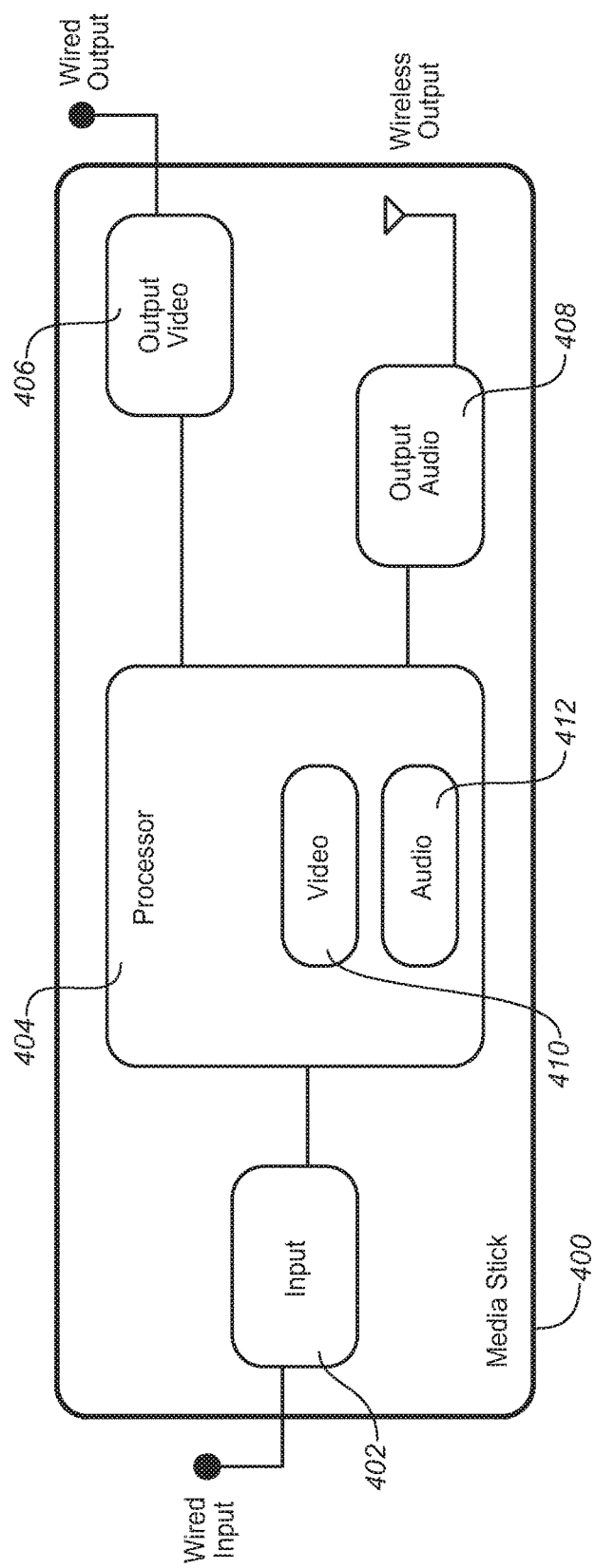
FIG. 4 is a block diagram of a media stick 400.

FIG. 4 is a block diagram of a media stick 400 (see also the media sticks 110 of FIG. 1, 200 of FIG. 2A, 250 of FIG. 2B, and 300 of FIG. 3). The media stick 400 generally interfaces between a source device and a display device via a wired path, and with wireless speakers via a wireless path (see FIG. 1). The media stick 400 includes an input interface 402, a processor 404, an output video interface 406, and an output audio transmitter 408.

The input interface 402 receives an input signal via a wired signal path. For example, the source device 130 (see FIG. 1) may be connected to the media stick 400 via a cord in order to provide the input signal. The input signal may be a high-definition input signal (e.g., an HDMI™ signal) that includes a video signal component and an audio signal component.

The processor 404 receives the input signal from the input interface 402, generates an output video signal, and generates an output audio signal. The processor 404 may include a video processor 410 that generates the output video signal, and an audio processor 412 that generates the output audio signal. Further details of the video and audio processing are provided below.

The output video interface 406 receives the output video signal from the processor 404 and outputs the output video signal via a wired output path. For example, the media stick 400 may use a connector such as the output interface 204 (see FIG. 2A) to provide the output video signal to the display device 120 (see FIG. 1).

The output audio transmitter 408 receives the output audio signal from the processor 404 and transmits the output audio signal via a wireless path. For example, the media stick 400 may use a wireless transmitter (e.g., a Bluetooth™ transmitter or a WiFi™ transmitter) to transmit the output audio signal to the wireless speakers 141-145 (see FIG. 1).

The output audio transmitter 408 may be a component of a wireless transceiver that performs other functions, such as interfacing the media stick 400 with a remote control device or a remote control application on a mobile telephone (as discussed below).

Additional details of the media stick 400 are provided below.

Figure 5:
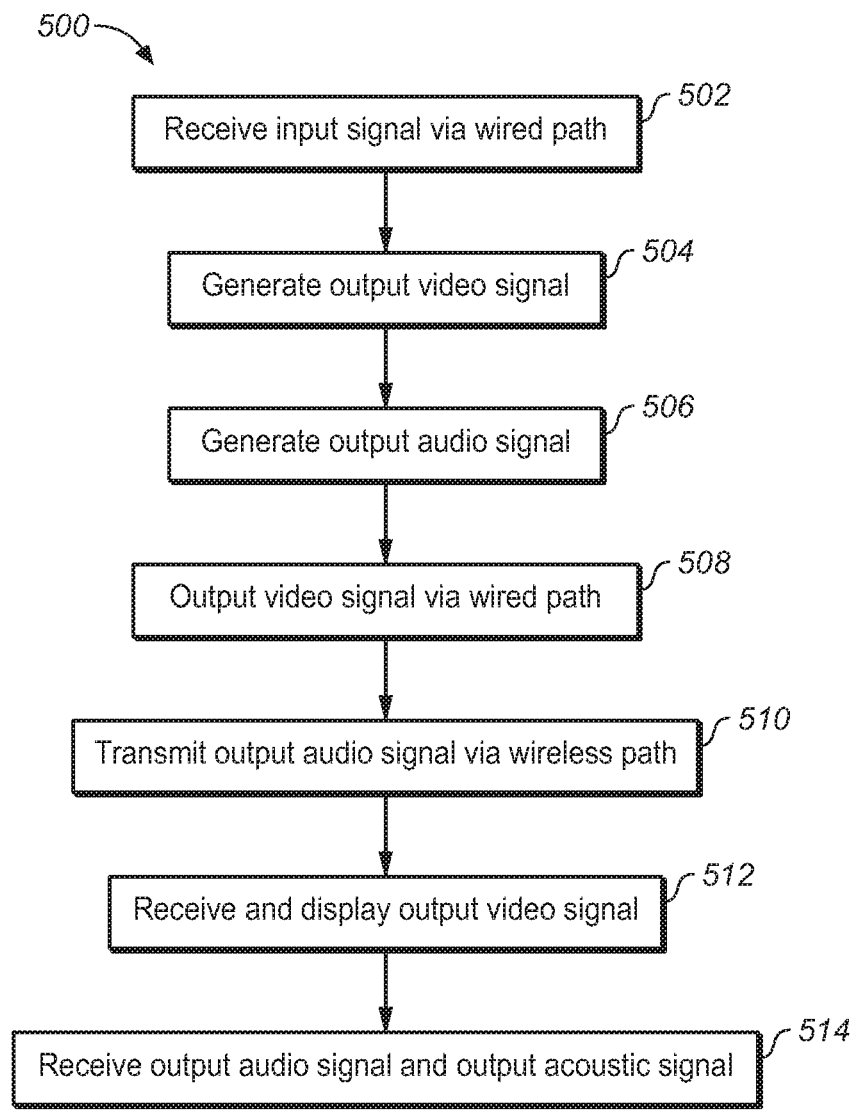
FIG. 5 is a flowchart of a method 500 for interfacing between a source media device and a destination media device via a wired signal path.

FIG. 5 is a flowchart of a method 500 for interfacing between a source media device and a destination media device via a wired signal path (see FIG. 1). The method 500 may be performed by the media sticks 110 of FIG. 1, 200 of FIG. 2A, 250 of FIG. 2B, 300 of FIG. 3, or 400 of FIG. 4, or by other components of the system 100 of FIG. 1, for example as controlled by one or more of computer programs, software or firmware.

At 502, an input signal is received via a wired input signal path. For example, the media stick 110 (see FIG. 1) receives the input signal from the source device 130. The input signal includes an input audio signal and an input video signal.

At 504, an output video signal is generated from the input signal. For example, the video processor 410 (see FIG. 4) may generate the output video signal from the input signal.

At 506, an output audio signal is generated from the input signal. For example, the audio processor 412 (see FIG. 4) may generate the output audio signal from the input signal.

At 508, the output video signal is output via a wired output signal path. For example, the output video interface 406 (see FIG. 4) may output the output video signal to the display device 120 (see FIG. 1) via a wired connection.

At 510, the output audio signal is transmitted via a wireless signal path. For example, the output audio transmitter 408 (see FIG. 4) may transmit the output audio signal to the wireless speakers 141-145 (see FIG. 1) via a wireless connection.

At 512, the output video signal is received via the wired path and displayed. For example, the display device 120 (see FIG. 1) may receive and display the output video signal.

At 514, the output audio signal is received via the wireless path and output as an acoustic signal. For example, the wireless speakers 141-145 (see FIG. 1) may receive and output the output audio signal as an acoustic signal.

Figure 6:
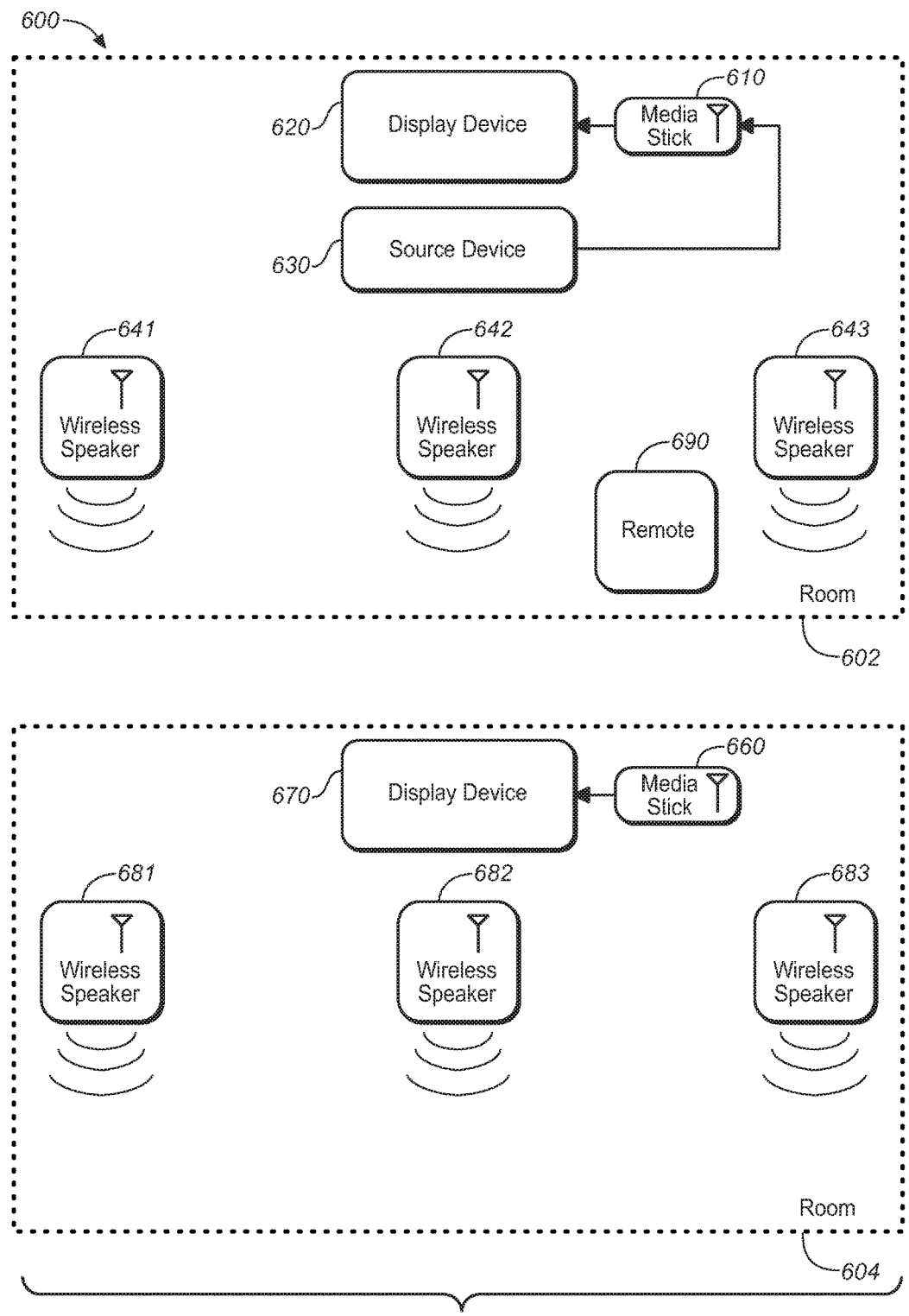
FIG. 6 is a block diagram of a system 600.

FIG. 6 is a block diagram of a system 600. The system 600 is implemented in a first room 602 and a second room 604. In the first room 602 are a media stick 610, a display device 620, a source device 630, and wireless speakers 641, 642 and 643. In the second room 604 are a media stick 660, a display device 670, and wireless speakers 681, 682 and 683. The system 600 also includes a remote control 690, which for ease of discussion is located in the first room 602.

The media sticks 610 and 660 may be similar to the media sticks 110 of FIG. 1, 200 of FIG. 2A, 250 of FIG. 2B, 300 of FIG. 3, or 400 of FIG. 4, and may implement portions of the method 500 of FIG. 5. The display devices 620 and 670 may be similar to the display device 120 of FIG. 1. The source device 630 may be similar to the source device 130 of FIG. 1. The wireless speakers 641-643 and 681-683 may be similar to the wireless speakers 141-145 of FIG. 1.

The media stick 610 is coupled to the display device 620 and to the source device 630. The media stick 610 receives the input signal form the source device 630. The media stick 660 is coupled to the display device 670.

The remote control 690 controls the operation of the system 600, as follows. When the remote control device 690 receives a first user selection, the remote control device 690 controls the media stick 610 to output the output video signal to the display device 620 and to transmit the output audio signal to the wireless speakers 641-643. In this situation, the media stick 660, the display device 670, and the wireless speakers 681-683 in the room 604 may be considered to be inactive.

When the remote control device 690 receives a second user selection, the remote control device 690 controls the media stick 610 to transmit wirelessly the input signal to the media stick 660 in the room 604. The media stick 660 outputs the output video signal to the display device 670, and transmits the output audio signal to the wireless speakers 681-683. In this situation, the display device 620 and the wireless speakers 641-643 in the room 602 may be considered to be inactive.

The above process may be referred to as place-shifting or place-casting. Place-shifting obviates the need for each room to have its own source device, or for running a long cable from the source device in one room to the display device in the other room.

Figure 7:
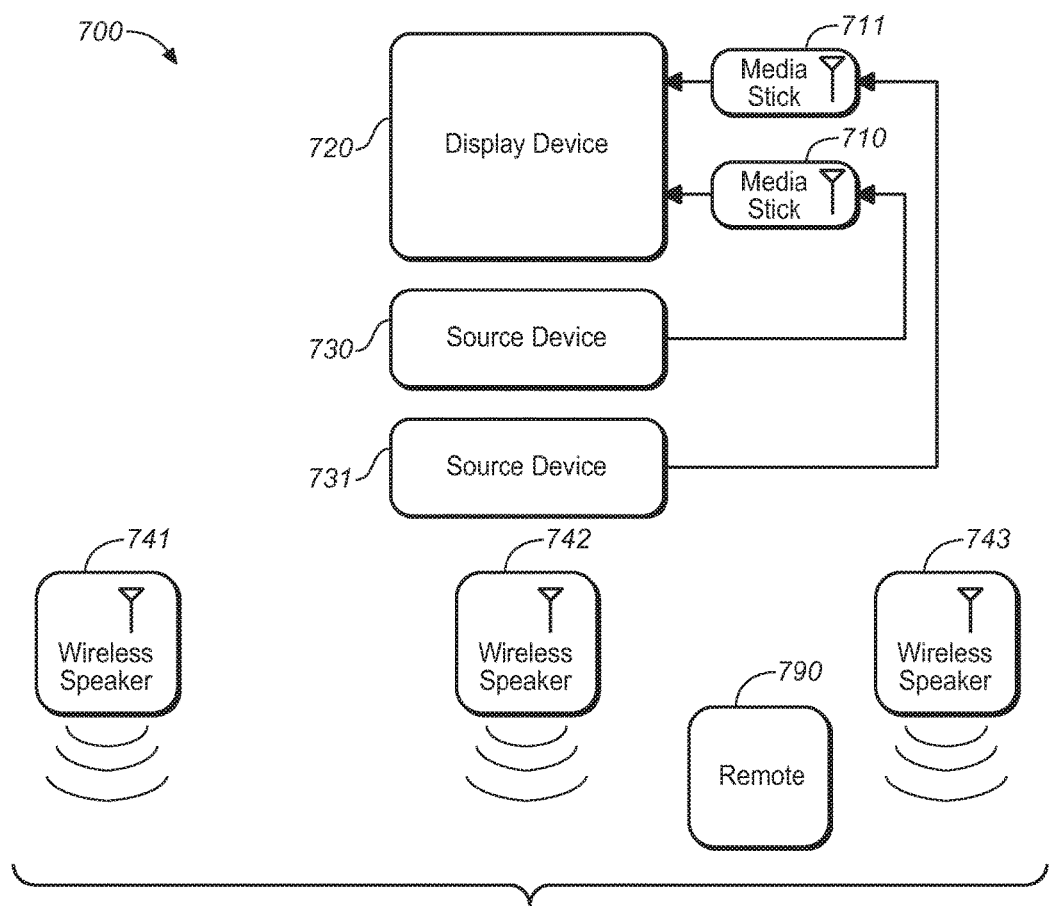
FIG. 7 is a block diagram of a system 700.

FIG. 7 is a block diagram of a system 700. The system 700 includes two media sticks 710 and 711, a display device 720, two source devices 730 and 731, wireless speakers 741, 742 and 743, and a remote control device 790. The media sticks 710 and 711 may be similar to the media sticks 110 of FIG. 1, 200 of FIG. 2A, 250 of FIG. 2B, 300 of FIG. 3, 400 of FIG. 4, or 610 or 660 of FIG. 6, and may implement portions of the method 500 of FIG. 5. The display device 720 may be similar to the display device 120 of FIG. 1. The source device 730 may be similar to the source device 130 of FIG. 1. The wireless speakers 741-743 may be similar to the wireless speakers 141-145 of FIG. 1.

The media stick 710 couples the source device 730 to the display device 720, and the media stick 711 couples the source device 731 to the display device 720.

The remote control 790 controls the operation of the system 700, as follows. When the remote control device 790 receives a first user selection, the remote control device 790 controls the media stick 710 to output its output video signal to the display device 720 and to transmit its output audio signal to the wireless speakers 741-743, and the remote control device 790 controls the display device 720 to display the output video signal from the media stick 710. In this situation, the media stick 711 may be considered to be inactive, and the user may be ambivalent about the state of the source device 731.

When the remote control device 790 receives a second user selection, the remote control device 790 controls the media stick 711 to output its output video signal to the display device 720 and to transmit its output audio signal to the wireless speakers 741-743, and the remote control device 790 controls the display device 720 to display the output video signal from the media stick 711. In this situation, the media stick 710 may be considered to be inactive, and the user may be ambivalent about the state of the source device 730.

The above process allows the user to easily switch between the source devices 730 and 731 as the input to the display 720 and to the wireless speakers 741-743.

Additional Features and Implementation Details

The following sections provide more details regarding additional features and implementation details. These details may be implemented in any of the above-described media sticks, systems, or related components (e.g., the remote control). Similar names are used for similar components.

SUMMARY

The media stick has the form factor of a high-definition dongle, including both a high-definition input and a high-definition output, and serves as an inline decoder for inputs on the back of a display device such as a television. The media stick includes wireless audio capabilities for connecting to one or more wireless audio speakers. Two or more media sticks may also be networked together, in effect creating a distributed audio-video receiver, but with significantly improved setup and ease-of-use.

The media stick represents a low cost of entry for a casual home entertainment consumer. As the media stick only occupies one input on the back of a television, and has networking benefits that grow when paired with additional media sticks, it has the potential to scale quickly in terms of market demand. In addition, when the media stick is integrated into an HD cable, a user can use the media stick as a cable replacement.

Remote Control

The remote may pair with the media stick over wireless (e.g., Bluetooth™, WiFi™ etc.), and interactively controls the media stick as well as connected devices (e.g., the source device, the display device, etc.). The behavior of the remote is similar to that of other smart remotes, but may minimize user setup through a number of techniques, such as enhanced extended display identification data (E-EDID), or via detection of infrared codes from remotes shipped with the various connected devices. Through a combination of on-screen interactivity with the user, the remote can control devices connected to each display in an intelligent and user friendly way.

In general, the remote control device includes a microcontroller, a wireless radio, and an infrared (IR) transmitter. The microcontroller controls the general operation of the remote control device, such as receiving user inputs from buttons or other input devices, managing state information of the remote control and associated devices, and managing information exchanges with the wireless radio and the IR transmitter. The wireless radio generally connects (pairs) the remote control with the media stick. The wireless radio may implement an IEEE 802.15.1 standard radio (e.g., Bluetooth™ radio, Bluetooth™ version 4.0, etc.), a WiFi™ radio, or an IEEE 802.15.4 standard radio (e.g., a ZigBee™ radio). The IR transmitter sends relayed IR commands. For example, when the media stick wants to send a command to the display device not over their HD connection, the media stick may transmit the command to the remote control, and the remote control relays the command to the display device as an IR signal.

The remote control may include user interface controls (e.g., buttons) for system power, directional/select pad, home, back, and volume control (up, down, mute, etc.). The remote control may connect to, control, or interact with two or more media sticks at the same time. The remote control has a state-based awareness of which devices are connected to the one or more media sticks and are active. This awareness may change the behavior of the appropriate keys on the remote control. For example, when playback is active on a Blu-Ray™ device, the behavior of the directional pad changes to operate the Blu-Ray™ device.

When a connected system is on, pressing the power button of the remote control turns off all related devices. When the system is off, pressing the power button turns on the devices previously on when power was last turned off. Controls may be sent to the related devices in a logical order. For example, the television may be the last device to turn off and the first device to turn on, as this is what the media stick draws its power from. Additionally, the method by which commands are sent to connected devices may follow a priority order, with reliable connections taking the highest priority. For example, if a connected device supports both CEC over HDMI™ and IR reception, CEC may be used.

Some of the functionality of the remote control may also be implemented in a smartphone app (e.g., an Android™ app or an iOS™ app). These functionalities are described in more detail below.

General Use Case

The general use case is as described above with reference to FIG. 1. The system generally performs surround decoding to wireless speakers from source devices. The media stick performs inline surround decoding (e.g., Dolby TrueHD™, Dolby Digital Plus™, Dolby Atmos™, etc.), and then wirelessly transmits the appropriate surround audio to paired wireless speakers. Various wireless protocols (e.g., WiFi Direct™) may be used to connect to the wireless speakers. As an example, extensions to the Miracast™ protocol may be used for controlling the transmissions to the wireless speakers. These wireless speakers may also include additional extensions, which may enable such things as arbitrary speaker placement, low power battery management for portable speakers, etc.

Streaming Use Case

In addition to the wired sources (e.g., FIG. 1, FIG. 6, FIG. 7, etc.), the media stick may also function as a streaming stick. The media stick may receive a stream as an input from the internet (e.g., a Netflix™ stream). The media stick may receive a stream as an input transmitted wirelessly from a device such as a mobile telephone or tablet. The media stick decodes the video and provides it to the display device over the wired connection, and sends the audio to the wireless speakers over the wireless connection.

Initial Device Setup

A smartphone app may be used to perform the initial setup of the media stick. This setup process may involve some steps that do not have to be repeated for typical usage of the system. For example, the user may enter information pertaining to the wireless network access point, which wireless speakers are available, and which devices is the media stick connected to.

The setup process is generally as follows. First, the user connects the media stick to a high-definition input (e.g., an HDMI™ input) of the display device (e.g., a television). The user connects a power input to the media stick (e.g., using a serial bus (e.g., USB™) output on the television for power). Next, the user downloads and runs the smartphone app for controlling the media stick (e.g., an iOS™ app or an Android™ app). Next, the user uses the smartphone app to connect the smartphone via wireless (e.g., WiFi Direct™) to the media stick. Next, in the mobile app, the user selects to set up a new device. Next, in the mobile app, the user identifies what speakers should be connected to the device. Next, in the mobile app, the user enters the login credentials for their home wireless (e.g., WiFi™) access point. Next, in the mobile app, the user selects which other electronic devices are connected to the system (if this step is not performed automatically via CEC and EDID identification). Next, in the mobile app, the user enters any other relevant preferences. Finally, in the mobile app, the user finalizes their selections which are transferred to and saved in the media stick.

Alternatively, the media stick may itself perform the setup process using an on-screen menu, when the media stick is first connected to the display device.

Secondary Device Setup

When a user connects a second media stick to a display device that already has a first media stick attached and configured, an initial series of exchanges occur via the CEC line from the first media stick to the second media stick. This exchange of information includes user preferences, speaker setup information, network credentials and connection information, and other related user dependent information.

Surround Decoding to Wireless Speakers Via ARC

The media stick may perform decoding from audio sent via Audio Return Channel (ARC) from the connected display device. This occurs when audio arrives to the display device by other means then direct hi definition connection, such as when a user is using an application to show over the top (OTT) content on the display device. When audio is received over ARC, the media stick performs audio decoding. The decoded audio is then transmitted via wireless to the wireless speakers, as discussed above.

Integrated Device Control and Switching with Remote

The user may use the remote control to switch inputs via the on-screen media stick interface displayed by the display device. For example, each source device has its own media stick, each of which has its own input connection to the display device, as shown in FIG. 7. This results in the remote control and the media sticks performing a combination of operations, which may include the following. First, the remote control transmits an infra-red (IR) signal from the remote control (or CEC signal from the first media stick), intended to switch the input source of the display device to the new input (the second media stick). Second, the media sticks update their cloned user interfaces to ensure a seamless transition of user experience. Third, the remote control transmits an IR signal (or the first media stick transmits a CEC signal), intended to turn on/off the source devices (e.g., turn off the first source device connected to the first media stick, and turn on the second source device connected to the second media stick). Fourth, the remote control changes its contextual awareness (state machine) to issue subsequent navigational commands to the new source device (e.g., the control pad of the remote now operates the second source device by IR command). The second media stick then becomes the active media stick.

Slaved Source Input Switching of Display Device

When more than one media stick is connected to the inputs of a display device, and a user changes the input source via the remote control, the active media stick identifies that change has occurred, and changes which stick is currently actively processing the audio. For example, when the first media stick is the active stick and is processing its audio, the second media stick is the inactive stick; when the input changes to the second media stick, it becomes the active stick and is processing its audio, and the first media stick is the inactive stick.

Volume Control Changes

One required interaction between the user and media sticks is the changing of volume as well as muting. As there may be more than one media stick connected to a display device, the remote control has an awareness of which one is active. The remote control transmits the appropriate command to the active media stick to change volume. In turn, this will cause the connected wireless speakers to properly lower or boost their volume.

Firmware Updates for Media Stick

A user may choose to have firmware updated automatically or be prompted for updates. When an update is ready and is authorized by the user, it shall download in the background. The user may choose to have the update installed when the system is not in use, or immediately.

Hardware Diagram for Media Stick

Figure 8:
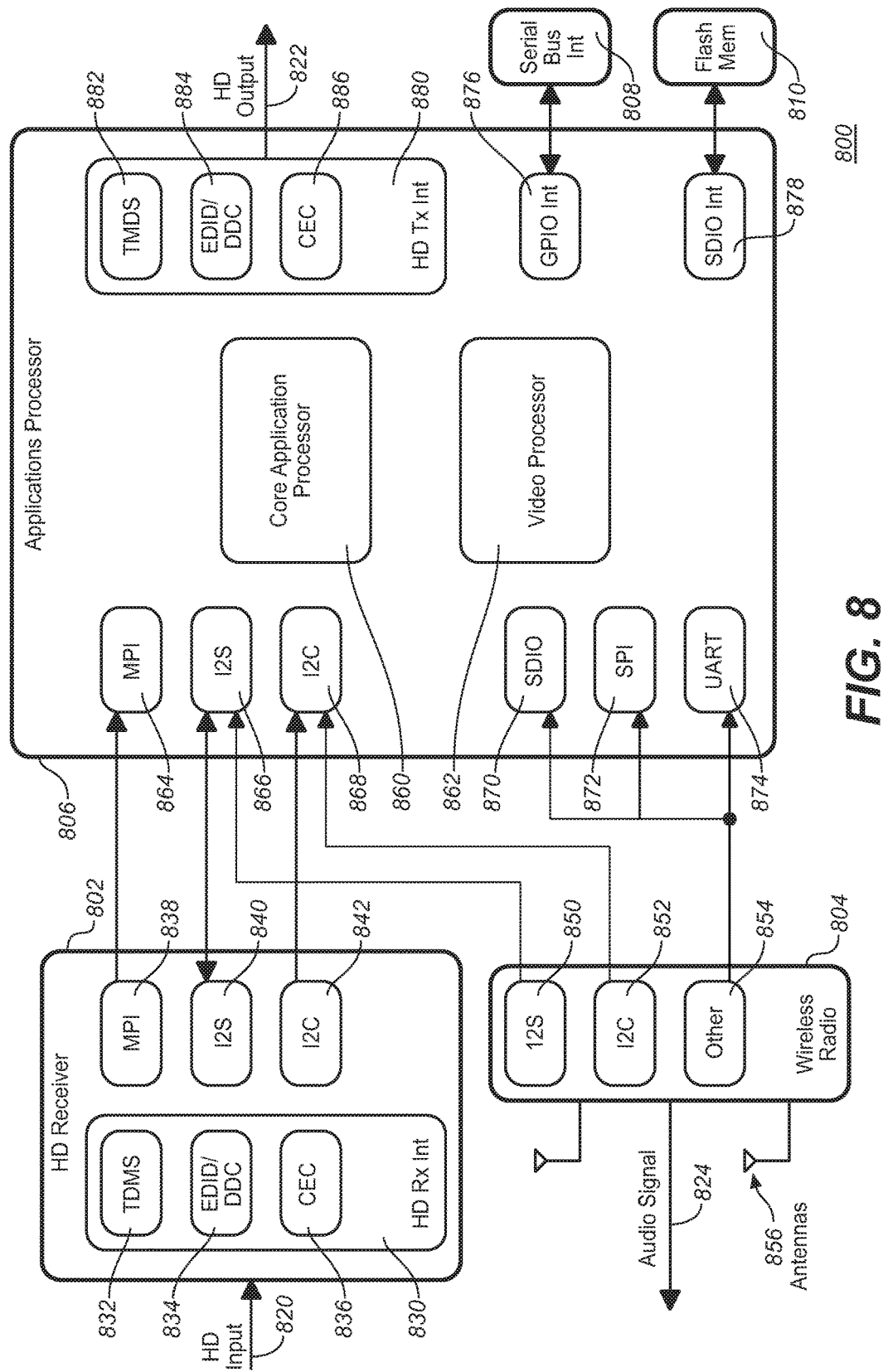
FIG. 8 is a block diagram of a media stick 800.

FIG. 8 is a block diagram of a media stick 800. The media stick 800 includes an HD receiver 802, a wireless radio transceiver 804, an applications processor 806, a serial bus interface 808, and a flash memory 810. In general, the media stick 800 receives an HD input 820 via a wired connection, outputs an HD output 822 via a wired connection, and outputs an audio signal 824 via a wireless connection, as discussed above (e.g., the media stick 400 of FIG. 4 and the other media sticks).

The HD receiver 802 generally receives the HD input 820 and converts the HD input 820 for further processing by the applications processor 806. The HD receiver 802 includes an HD receiver (Rx) interface 830, a mobile processor interface (MPI) transmitter 838, an integrated interchip sound (I2S) interface 840, and an inter-integrated circuit (I2C) interface 842. The HD Rx interface 830 includes a TMDS receiver 832, an EDID/DDC receiver 834, and a CEC receiver 836. The MPI transmitter 838 may be a Mobile Industry Processor Interface for Camera Serial Interface (MIPI™ for CSI) transmitter, in which case the HD receiver 802 converts the HD input 820 into MIPI™ for CSI data. The HD to MIPI™ for CSI conversion may have the following features: support for HD resolutions up to 1080p at 60 fps (frames per second), high-bandwidth digital content protection (HDCP) copyright protection, configurable EDID, and high resolution audio interface support. The MIPI™ for CSI conversion may be performed when the applications processor 806 lacks native support for HD signals (e.g., HDMI™ signals). Alternatively, the MPI transmitter 838 may provide the HD signals themselves to the applications processor 806, when the applications processor 806 is itself able to process HD signals.

The wireless radio transceiver 804 generally receives information from the applications processor 806 for transmission as the audio signal 824, and receives other information (e.g., from the remote control) to provide to the applications processor 806. The wireless radio transceiver 804 includes an I2S interface 850, an I2C interface 852, other interfaces 854, and one or more antennas 856. The I2S interface 850 receives the audio information from the applications processor 806 as pulse coded modulation (PCM) data. The other interfaces 854 include a secure digital input output (SDIO) interface, a serial peripheral interface (SPI) bus interface, and a universal asynchronous receiver/transmitter (UART) interface. The antennas 856 may include a Bluetooth™ antenna and a WiFi™ antenna. The wireless radio transceiver 804 may include the following features: support for up to IEEE 801.11ac standard multiple-input and multiple-output (MIMO), operation in the 2.4 GHz and 5 GHz bands, Bluetooth™ (e.g., Bluetooth™ version 2.0, 2.1, 4.0, 4.1, etc.) and certified for WiFi Direct™ (e.g., WiFi Direct™ version 1.0), Wifi Display™ (e.g., Wifi Display™ version 1.0), and WiFi Miracast™. When connected to IEEE 802.11n/g/a standard connections, the wireless radio transceiver 804 may establish the maximum possible data rate. The wireless radio transceiver 804 may support Bluetooth™ enhanced data rate (EDR) for connection to a source device, in order to implement stereo audio streaming from the source device to the media stick 800, or for connection to a display device, in order to implement stereo audio streaming from the media stick 800 to the display device. The wireless radio transceiver 804 may support Bluetooth™ version 4.1 for use with low power smart remote connectivity.

The applications processor 806 generally processes the HD input to generate the audio signal 824 for the wireless radio transceiver 804 and the HD output 822. The applications processor 806 includes a core applications processor 860, a video processor 862, a mobile processor interface receiver 864, an I2S interface 866, an I2C interface 868, a SDIO interface 870, a SPI bus interface 872, a UART interface 874, a general-purpose input/output (GPIO) interface 876, a SDIO interface 878, and a HD transmitter (Tx) interface 880.

The core applications processor 860 generally controls the operation of the media stick 800, including generating the audio information from the HD input 820, and interfaces with the video processor 862 to implement a hardware accelerated video processing pipeline. The core applications processor 860 may implement a reduced instruction set computing (RISC) architecture, for example the ARM Cortex-A9 or the ARM Cortex-A15 with the NEON media processing engine, implementing the ARM v7 instruction set or later. The core applications processor 860 may have two, four or more cores. The core applications processor 860 may operate at 1.2 GHz or higher. The hardware accelerated video processing pipeline is able to process video data at 1080i resolution, 60 fps, with H.264 video encoder/decoder support.

The mobile processor interface receiver 864 receives the data from the mobile processor interface transmitter 838. The I2S interface 866 exchanges I2S data with the I2S interfaces 840 and 850. The I2C interface 868 exchanges I2C data with the I2C interfaces 842 and 852. The SDIO interface 870, the SPI bus interface 872, and the UART interface 874 exchange data with the other interfaces 854. The GPIO interface 876 interfaces with the serial bus interface 808. The SDIO interface 878 interfaces with the flash memory 810.

The HD Tx interface 880 generally transmits the HD output 822. The HD Tx interface 880 includes a TMDS transmitter 882, an EDID/DDC transmitter 884, and a CEC transmitter 886. The HD Rx interface 830 and the HD Tx interface 880 may receive and transmit HDMI™ signals conforming to HDMI™ version 1.4, including CEC commands and high resolution audio.

The serial bus interface 808 generally provides a serial connection for the media stick 800. The serial bus interface 808 may be a USB™ interface with support for a USB™ 2.0 hub. The serial bus interface 808 may provide a power connection for the media stick 800.

The flash memory 810 generally provides data storage for the media stick 800. The flash memory 810 may be sized between 2 and 4 gigabytes.

The media stick 800 may execute the Android™ operating system, for example version 4.4 (KitKat) or 5.0 (Lollipop).

Video and Audio Format Support

The HD inputs and outputs implemented by the media stick may be HDMI™ inputs and outputs, in particular HDMI™ version 2.0.

The media stick may implement one or more of the following video resolutions: 480i, 480p, 720p, 1080i, 1080p, and 4K resolution. The media stick may implement one or more of the following frame rates: 24p fps, 25p fps, 30i fps, 30p fps, 50i fps, 50p fps, 60i fps, and 60p fps. The media stick may implement 3D video or deep color.

The media stick may implement PCM audio, with encoded audio support, and support for the audio return channel (ARC). The PCM audio may be up to 8 channels of linear PCM (LPCM), at up to 192 kHz, and up to 24 bits of audio data. The encoded audio support may include Dolby Digital™, Dolby Digital Plus™, and Dolby TrueHD™ (with high bit rate (HBR) support). The ARC support may include 2 channels at 192 kHz (e.g., capable of transport for Dolby Digital Plus™).

Auto-Calibration

The media stick may also perform the central processing for auto-calibrating speakers. Through the use of extensions to Miracast™ signals, each connected speaker may include one or more microphones, and may continually monitor the audio produced by other connected speakers. This monitored audio may then be retransmitted back to the media stick and used to determine the relative locations of each speaker.

For example, the media stick 800 may implement auto-calibration. The wireless radio transceiver 804 may receive information from the wireless speakers, generated by the microphone on each speaker. This information is processed by the core applications processor 860 to pull out the relative location information of the speakers, which the core applications processor 860 uses to perform auto-calibration of the audio signal 824. The core applications processor 860 may implement an auto-discovery process to perform the auto-calibration processing.

WiFi Display™ and WiFi Miracast™ Features

The media stick extends existing features of the WiFi Display™ and WiFi Miracast™ protocols. For example, WiFi Miracast™ may only permit a 1-to-1 connection, but the media stick extends support to multiple speakers simultaneously (1-to-many connection). For example, the media stick may form a peer-to-peer group between the media stick and the connected wireless speakers.

Implementation Details

An embodiment of the invention may be implemented in hardware, executable modules stored on a computer readable medium, or a combination of both (e.g., programmable logic arrays). Unless otherwise specified, the steps included as part of the invention need not inherently be related to any particular computer or other apparatus, although they may be in certain embodiments. In particular, various general-purpose machines may be used with programs written in accordance with the teachings herein, or it may be more convenient to construct more specialized apparatus (e.g., integrated circuits) to perform the required method steps. Thus, the invention may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein. (Software per se and intangible or transitory signals are excluded to the extent that they are unpatentable subject matter.)

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. An apparatus for interfacing between a source media device and a destination media device via a wired signal path, comprising:

an input interface that receives an input signal via a wired input signal path, wherein the input signal includes an input audio signal and an input video signal;

a processor that receives the input signal from the input interface, that generates an output video signal, and that generates an output audio signal;

an output video interface that receives the output video signal from the processor and outputs the output video signal via a wired output signal path;

an output audio transmitter that receives the output audio signal from the processor and transmits the output audio signal via a wireless signal path; and a media stick housing having a dongle form factor, wherein the media stick housing contains the input interface, the processor, the output video interface, and
the output audio transmitter,
the apparatus further comprising:
  a first connector;
  a second connector;
  a sensing circuit; and
  a routing circuit, wherein when the sensing circuit senses that the first connector is connected to the destination media device, the routing circuit configures the first connector to operate as the output video interface and the second connector to operate as the input interface, and
wherein when the sensing circuit senses that the second connector is connected to the destination media device, the routing circuit configures the second connector to operate as the output video interface and the first connector to operate as the input interface.

2. The apparatus of claim 1, wherein the processor comprises a video processor and an audio processor, wherein the video processor generates the output video signal, and wherein the audio processor generates the output audio signal.

3. The apparatus of claim 1, wherein the input signal comprises a high-definition input signal having a display data channel, a transition-minimized differential signaling data channel, a consumer electronics control channel, an audio return channel, and a high-definition Ethernet channel.

4. The apparatus of claim 1, wherein the output audio signal comprises a surround audio signal, and wherein the output audio transmitter transmits the surround audio signal to a plurality of wireless speakers.

5. The apparatus of claim 1, further comprising:
  a wireless transceiver that includes the output audio transmitter, wherein the wireless transceiver exchanges information with a remote control device.

6. The apparatus of claim 1, further comprising:
  a wireless transceiver that includes the output audio transmitter, wherein the wireless transceiver exchanges information with a mobile telephone that implements a remote control application.

7. The apparatus of claim 1, further comprising:
  a wireless transceiver that includes the output audio transmitter, wherein the wireless transceiver exchanges information with a remote control device, wherein the information includes pairing information that pairs the apparatus and the remote control device.

8. The apparatus of claim 1, further comprising:
  a wireless transceiver that includes the output audio transmitter, wherein the wireless transceiver exchanges information with a mobile telephone that implements a remote control application, wherein the information includes pairing information that pairs the apparatus and the mobile telephone.

9. The apparatus of claim 1, further comprising:
  a wireless transceiver that includes the output audio transmitter, wherein the wireless transceiver exchanges information with at least one wireless speaker, wherein the information includes pairing information that pairs the apparatus and the at least one wireless speaker.

10. The apparatus of claim 1, wherein the output video interface receives an audio return channel (ARC) signal via the output wired signal path, wherein the processor decodes the ARC signal as a decoded output audio signal, and wherein the output audio transmitter transmits the decoded output audio signal via the wireless signal path.

11. The apparatus of claim 1, further comprising:
  a power connector that receives electrical energy that provides power to the apparatus.

12. The apparatus of claim 1, further comprising:
  a first high-definition cable connected to the input interface that implements the wired input signal path; and
  a second high-definition cable connected to the output interface that implements the wired output signal path.

13. The apparatus of claim 1, further comprising:
  a high-definition cable that includes the apparatus, wherein the apparatus is permanently integrated inline into the high-definition cable.

14. The apparatus of claim 1, wherein the input interface includes a first high-definition cable, and wherein the output interface includes a second high-definition cable.

15. The apparatus of claim 1, wherein the media stick housing is permanently integrated inline as part of a single high-definition cable.

16. The apparatus of claim 1, wherein the output video interface is coupled to a display device, and wherein the apparatus receives electrical energy from the display device to power the apparatus.

17. A method for interfacing between a source media device and a destination media device via a wired signal path, comprising:
  receiving, by an input interface, an input signal via a wired input signal path, wherein the input signal includes an input audio signal and an input video signal;
  generating, by a processor, an output video signal from the input signal;
  generating an output audio signal from the input signal;
  outputting, by an output video interface, the output video signal via a wired output signal path; and
  transmitting, by an output audio transmitter, the output audio signal via a wireless signal path,
  wherein a media stick housing, having a dongle form factor, contains the input interface, the processor, the output video interface, and the output audio transmitter,
  the method further comprising:
  when a sensing circuit senses that a first connector is connected to the destination media device, configuring, by a routing circuit, the first connector to operate as the output video interface and a second connector to operate as the input interface; and
  when the sensing circuit senses that the second connector is connected to the destination media device, configuring, by the routing circuit, the second connector to operate as the output video interface and the first connector to operate as the input interface.

18. A system for interfacing between a source media device and a destination media device via a wired signal path, comprising:
  a media stick, including:
    an input interface that receives an input signal via a wired input signal path, wherein the input signal includes an input audio signal and an input video signal,
    a processor that receives the input signal from the input interface, that generates an output video signal, and that generates an output audio signal,
    an output video interface that receives the output video signal from the processor and outputs the output video signal via a wired output signal path,
    an output audio transmitter that receives the output audio signal from the processor and transmits the output audio signal via a wireless signal path, and a media stick housing having a dongle form factor, wherein the media stick housing contains the input interface, the processor, the output video interface, and the output audio transmitter; and at least one wireless speaker that receives the output audio signal via the wireless signal path and that outputs an acoustic signal that corresponds to the output audio signal, the media stick further comprising:
a first connector;
a second connector;
a sensing circuit; and
a routing circuit, wherein when the sensing circuit senses that the first connector is connected to the destination media device, the routing circuit configures the first connector to operate as the output video interface and the second connector to operate as the input interface, and wherein when the sensing circuit senses that the second connector is connected to the destination media device, the routing circuit configures the second connector to operate as the output video interface and the first connector to operate as the input interface.

19. The system of claim 18, wherein the at least one wireless speaker comprises a plurality of wireless speakers, wherein the media stick further comprises a wireless transceiver that includes the output audio transmitter, wherein the wireless transceiver exchanges information with the plurality of wireless speakers, wherein the information includes relative location information of the plurality of wireless speakers, and wherein the processor performs auto-calibration of the output audio signal according to the relative location information.

20. The system of claim 18, wherein the media stick further comprises a wireless transceiver that includes the output audio transmitter, the system further comprising:
a remote control that exchanges information with the media stick via the wireless transceiver.

21. The system of claim 18, further comprising:
a display device, coupled to the output video interface via the wired output signal path, that receives the output video signal and that displays a video output that corresponds to the output video signal.

22. The system of claim 18, further comprising:
a source device, coupled to the input interface via the wired input signal path, that generates the input signal.

23. The system of claim 18, further comprising:
a source device, coupled to the input interface via the wired input signal path, that generates the input signal; and
a display device, coupled to the output video interface via the wired output signal path, that receives the output video signal and that displays a video output that corresponds to the output video signal.

* * * * *